United States Patent [19]

Kawashima et al.

[11] 4,418,113

[45] Nov. 29, 1983

[54] REINFORCING MAT FOR FIBER REINFORCED PLASTIC MATERIAL

[75] Inventors: Sadao Kawashima; Chiharu Ito, both of Sohwa, Japan

[73] Assignee: Asahi Fiber Glass Company Limited, Tokyo, Japan

[21] Appl. No.: 404,419

[22] Filed: Aug. 2, 1982

Related U.S. Application Data

[63] Continuation of Ser. No. 239,648, Mar. 2, 1981, abandoned.

[30] Foreign Application Priority Data

Mar. 21, 1980 [JP] Japan .............................. 55-35804[U]

[51] Int. Cl.³ ...................... B32B 17/02; B32B 17/04; B32B 17/12
[52] U.S. Cl. .................................... 428/213; 156/332; 427/336; 428/219; 428/284; 428/288; 428/292; 428/298; 428/302; 428/392
[58] Field of Search ............... 428/213, 284, 280, 288, 428/282, 292, 294, 297, 298, 302, 375, 392, 397; 156/332; 427/336

[56] References Cited

U.S. PATENT DOCUMENTS 3,425,454 2/1969 Eakins et al. ........................ 428/397
4,044,188 8/1977 Segal ................................... 428/298
4,278,720 7/1981 Shannon .............................. 428/288

*Primary Examiner*—Paul J. Thibodeau
*Attorney, Agent, or Firm*—Oblon, Fisher, Spivak, McClelland & Maier

[57] ABSTRACT

A reinforcing mat for fiber reinforced plastic material comprises a first layer of longer glass fiber strands which are formed by collecting at least 300 glass fibers and are arranged in a non-directional and curled state and a second layer of shorter glass strands arranged in a non-directional state which has a thickness smaller than said first layer, said glass fiber strands of each layer being bonded with a binder.

18 Claims, 1 Drawing Figure

REINFORCING MAT FOR FIBER REINFORCED PLASTIC MATERIAL

This a continuation of application Ser. No. 239,648, filed Mar. 2, 1981, now abandoned.

BACKGROUND OF THE INVENTION

1. Field of the Invention

The present invention relates to a glass fiber mat for a fiber reinforced plastic material (hereinafter referred to as FRP).

2. Description of the Prior Art

FRP, which is prepared by impregnating a fiber reinforced mat made of a material such as glass fiber with liquid thermosetting resin and curing the resin, has a large mechanical strength and corrosion resistance and is widely used as a structural substrate for various articles such as a tank, a bathtub, a boat, etc. The strength of the FRP depends upon: (1) the kind of fiber reinforced mat and resin forming the FRP; (2) the ratio of the resin to the fiber reinforced mat; (3) the method of molding; and (4) the curing condition of thermosetting resin. Among these elements, the kind of fiber reinforced mat and the ratio of the resin to the fiber reinforced mat highly affect the strength of the FRP. Various proposals for obtaining FRP having a large strength have been known. For example, glass fiber rovings are regularly arranged in one direction to enhance the strength of the mat in that direction. However, such a mat has a disadvantage in that the strength in the direction perpendicular to that direction is inferior.

Normally, the strength of the FRP depends upon the percentage in weight of the fiber reinforced mat in the FRP (this will be referred as GG). A FRP having a large GC can be easily obtained by a press-molding process whereas it is difficult to obtain the FRP having a large GC by a hand-lay-up process. Accordingly, it is difficult to prepare a large article such as a ship with a sufficient strength, because it is difficult to manufacture a ship by press-molding process.

It is possible to obtain FRP having a large GC and a large strength by the hand-lay-up process by using a cloth made of glass fiber rovings (woven roving) as a fiber reinforcing material. The resulting woven roving has disadvantages in that (1) the strength of the woven roving in the biased direction is lower than that of the longitudinal and transversal directions (the direction of roving) and (2) air bubbles are apt to enter into spaces between the glass fibers when the woven roving is impregnated with liquid thermosetting resin and the presence of the air bubbles between the glass fibers causes strength reduction and poor appearance of the FRP.

SUMMARY OF THE INVENTION

It is an object of the present invention to overcome the disadvantages of the conventional fiber reinforced mat and to provide a glass fiber mat for reinforcing FRP which has a large GC; and is free from the non-uniformity of strength caused by arranging the direction of the glass fibers and the entrapped air bubbles are easily removable.

These and the other objects of the present invention have been attained by providing a glass fiber mat for reinforcing the FRP which comprises a first layer of longer sized glass fiber strands which is formed by accumulating more than 300 collected glass fibers in a non-directional and curled state and a second layer of shorter sized glass fiber strands arranged in a non-directional state which has a thickness smaller than said first layer and is bonded on it.

It is possible to obtain a FRP product having a uniform strength in the direction parallel to the laminating direction by using a glass fiber mat for reinforcing the FRP of the present invention (hereinafter referred to as a reinforcing mat). It is also possible to increase the strength to one direction, if desired. In this case, when the relation of strength to direction is shown by plotting on the polar coordinates, an oval-like configuration is obtained. Accordingly a substantial reduction of strength in any direction (bias direction) does not occur as it does with the conventional reinforcing material using the woven roving.

Said first layer of the longer glass fiber strands can be formed by mixing more than two kinds of strands with different number of collected filaments or it can be formed by overlapping two layers which are produced with different kinds of strands.

The sectional view of the longer sized glass fiber strand used in the first layer can be circular or flattened in shape.

In a preferred embodiment of the present invention, the ratio of thickness of the first layer to the second layer is about 1:1/10–1, preferably about 1:½–1/5.

In another embodiment of the present invention, when the second layer of the shorter sized glass fiber strands accumulated in a non-directional state is bonded to the first layer of the longer sized glass fiber strands accumulated in a non-directional and curled state, each glass fiber strand layer and individual strands in each layers are bonded together by using a binder so as not to be dissolved by the styrene for at least twenty seconds.

DETAILED DESCRIPTION OF THE PREFERRED EMBODIMENTS

Figure 1:
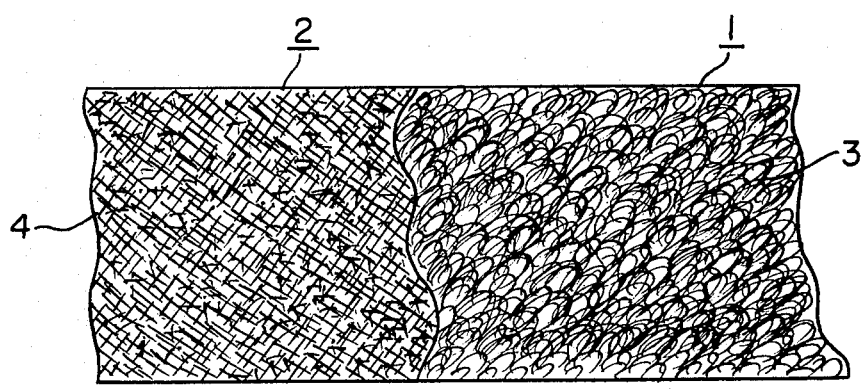
FIG. 1 is a plane view without a part of a second layer of the reinforcing mat for FRP of the present invention.

An embodiment of the reinforcing mat of the present invention will be described.

A first layer (1) and a second layer (2) are bonded together preferably with a binder. The binder can be a polyester binder. Both layers can be bonded after the first layer and the second layer are separately formed by binding the glass fiber strands for each layer. Another way is to laminate the glass fiber strands for the second layer on the first layer in which binder is applied to the glass fiber strands and the laminated layers are compressed and heated to soften the binder to perform the bonding of the glass fiber strands in each layer and the bonding of the first and the second layer simultaneously. The later process is advantageous from the viewpoint of industrial production.

The first layer comprises glass fiber strands formed by gathering a number larger than 300, preferably in the range between 600 and 1200 glass filaments. The diameter of each glass filament of the strands (3) can be in the range between 5 and 25 $\mu$m, preferably between 10 and 23$\mu$ and the tex (count of yarn or yield of yarn, gr per 1000 m) of the glass fiber strand can be in the range between 200 and 400.

The glass fiber strands are produced by mechanically pulling a molten glass flowing from bushings to attenuate them and by applying a sizing agent to collect them.

The sizing agent can be an aqueous medium containing a coupling agent such as silane coupling agent, a lubricant such as a condensation product of a stearic acid and tetraethylenepentammine and a film former such as polyvinyl acetate.

The glass fiber strands are accumulated in a non-directional and curled state so that the accumulation rate of the glass fiber strands is in a range between 400 and 1500 gr/m$^2$, preferably between 600 and 1000 gr/m$^2$. In order to form accumulated glass fiber strands, an apparatus disclosed in, for example, Japanese examined Utility Model publication No. 234/1968 can be employed so that a large number of glass fiber strands is put on a conveyor moving at a constant speed so as to be accumulated in a non-directional and curled stated with a predetermined width, thus a continuous strip of accumulated strands is provided (this process is referred to as a continuous method). In the above-mentioned disclosure, the glass fiber strand formed by collecting a number of glass filaments pulled from bushings are accumulated directly on the conveyor without any winding operation for the strand. It is possible to wind the collected glass fiber strands on a cylindrical member and then use the wound strands to form the first layer by the same process as the previously mentioned process (this process is referred to as a non-continuous method).

The length of the glass fiber strands wound on the cylindrical member is very long as much as about 5000 to 20000 in. The strip of glass fiber mat obtained by this method is, therefore, formed by very long glass fiber strands (The end portion of the strip is sometimes cut so that shorter glass fiber strands may be included in the cut end portion even though the amount is small). However, the object of the present invention can be attained by accumulating in a non-directional and curled state the glass fiber strands even when the length of the cut strands is relatively small. It is preferable to provide as large a length as possible to improve the property of the FRP. The length to be cut can be 60 cm or more, preferably in a range between 1 m and 3 m. Thus, a FRP having a sufficient strength can be obtained with the glass fiber strands cut at a specific length.

In the preparation of the first layer from the strip obtained by the continuous method, it is formed by compressing the strip by a pair of rollers or belts while applying heat so as to bond them together.

A similar process can be applied when the first layer is formed using the strip obtained by the non-continuous method.

It is possible to prepare a FRP having a large strength and GC even by the hand-layer-up process by using the first layer impregnated with a liquid thermosetting resin. In the preparation of the first layer, the moving speed of the conveyor on which the longer sized glass fiber strands are accumulated or the rate of accumulation of the glass fiber strands on the conveyor is controlled to control the curling shape of the strands. When the resulting first layer is used to reinforce the FRP, it is possible to increase a strength of the FRP (tensile strength in the direction parallel to the laminated surface) in a desired direction or to impart an equal strength in any direction parallel to the laminated surface.

The glass fiber strands are apt to be arranged in the moving direction of the conveyor when its moving-speed is increased, thereby providing a layer having a large tensile strength in the moving direction (The same effect can be obtained by arranging two conveyors at different speeds in the same direction and one of the conveyor is operated faster). On the other hand, when the moving speed of the conveyor is made slow, the tensile strength of the layer in the moving direction becomes small. When the conveyor having a middle speed range is used, a FRP having a uniform tensile strength in any direction can be obtained.

It is necessary to apply a rolling operation for smoothing the surface of the FRP or for removing air bubbles in the case of preparation of FRP with the first layer by the hand-lay-up process. In the application of the hand-lay-up rollers, the glass fiber strands tend to move in the lateral direction since the movement of the strands in the lateral direction is not restricted as is the roving in woven roving. This results in the wrapping of the glass fiber strands in the surface of the first layer around the rollers causing the surface layer to peel off, even though the application of the rollers removes air bubbles easily.

The inventors of this application have studied the above-mentioned problem and have found that the peeling of the strands can be effectively prevented by providing on the first layer the second layer with shorter sized glass fiber strands put in a non-directional state. The length of the glass fiber strands of the second layer can be in the range between 2 cm and 15 cm, preferably between 3 cm and 10 cm and the thickness of the second layer can be in the range between 0.1 mm and 1.0 mm (50–500 gr/m$^2$), preferably between 0.4 mm and 0.8 mm (200–400 gr/m$^2$).

When the thickness is too large, the strength and the GC of the resulting FRP decrease, whereas when the thickness is too small, a sufficient effect can not be expected. It is preferable to use glass filaments with a diameter in the range between $9\mu$ and $13\mu$ and the count of yarn of the glass fiber strands in the range between about 10 and about 350. When the count of yarn is too large, it is necessary to increase the thickness of the second layer to prevent the peeling, whereas when it is too small, the thickness of the surface layer with a small GC increases to cause the reduction in strength.

The second layer can be prepared by using the same method as the chopped strand mat production. For example, the second layer can be obtained by pulling a large number of glass fiber strands (or rovings) from each wound glass fiber strand; feeding the strands into a cutter to cut the strands at a predetermined length; dropping the cut strands onto a moving conveyor; applying a binder if desired and compressing and heating the accumulated strands as in the preparation of the first layer.

It is possible to use the first layer and the second layer merely overlapped or wound in a rolled shape after having merely overlapped them in order to use the overlapping layers as a reinforcing mat for FRP. It is preferable for handling to previously bond the first layer and the second layer with a binder. Both layer can be bonded by applying a binder to the first layer and the second layer each having been separately prepared and then compressing the overlapped layers in a heated condition. A more practical way is to put a glass fiber strand layer as the second layer with a binder on the glass fiber strand layer as the first layer and commpressing while heating the overlapping layers to perform both the bonding of individual glass fiber strands in each layer and the bonding of the two layers.

In a specified embodiment of the present invention, longer sized glass fiber strands having a flattened shape in cross section are used for forming a first layer. Such flattened shaped strands are prepared by: attenuating molten glass flowing from a large number of bushing orifices into glass filaments; applying a commercially available sizing agent such as vinyl acetate, polyester, epoxy etc, to the glass filaments to collect them into glass fiber strands; and winding each strand around a mandrel driven at a high speed while imparting a traversing movement to the strand; thus a strand having a flattened cross section is produced by the tight winding of the strand around the mandrel. The ratio of the thickness of the flattened strand to its width is about 1:10 to 1:20. It is possible to make the cross sectional shape flat by passing the glass strand between a pair of faced rollers. A second layer is formed with cut glass fiber strands having a relatively small sectional area which are distributed uniformly in a substantially non-directional state so that the presence of the second layer renders the surface of a FRP smooth and prevents the longer sized glass fiber strands from tending to wrap around the roller when the rolling operation is applied to an uncured FRP.

The reinforcing mat for FRP of the above-mentioned embodiment has advantages as follows:

(1) The GC of a FRP can be remarkably increased because the first layer is mainly formed by longer sized glass fiber strands having a relatively large and flattened cross sectional area; the reduction of strength in a biased direction, as found in the conventional product using cloth, is prevented; air bubbles can be easily removed thereby providing a FRP having a large strength.

(2) The surface of the FRP is made smooth and the rolling operation is performed without causing any wrapping of the strands around a roller because the first layer is overlapped by the second layer which is formed by shorter sized glass fiber strands having a relatively small sectional area.

(3) In the conventional FRP using woven roving to which a gel-coating is applied, a texture pattern of the woven roving rises on the gel-coated surface, whereas a FRP using a reinforcing mat of the present invention provide a substantially smooth surface.

In another embodiment using glass fiber strands having a circular cross section to form the first layer, strands having a circular cross section are prepared by applying a liquid sizing agent such as polyester, epoxy etc. to a large number of glass filaments flowing from bushing orifices to collect them into a single glass fiber strand, whose cross sectional shape is rounded because of the interfacial tension of the liquid sizing agent. The first layer is formed by bringing a number of strands having a circular cross section into contact with the surface of a cylindrical member rotated at high speed to pull and throw them in a non-directional manner on a moving conveyor and by applying a binder to such accumulated strands.

The reinforcing mat for FRP of the above-mentioned embodiment has an advantage in that the GC of a FRP can be increased; the reduction of strength in a biased direction is prevented; air bubbles can be easily removed; and a FRP having an excellent wetthrough property of resin into glass fiber strand and a large strength can be obtained because the first layer is mainly formed by longer sized glass fiber strands having a relatively large and circular cross sectional area.

In accordance with the other embodiment of the present invention, a good result can be obtained by using a reinforcing mat for FRP which is prepared by binding glass filaments of each glass fiber strand with a sizing agent soluble in styrene so as not to be dissolved in the styrene for at least twenty seconds. The reinforcing mat comprises a first layer of longer sized glass fiber strands accumulated in a non-directional and curled state and a second layer of shorter sized glass fiber strands accumulated in a non-directional state which is bonded to the first layer and the glass filaments of each glass fiber strands of the first and the second layers are combined with the sizing agent soluble in the styrene so as not be dissolved by the styrene for at least twenty seconds.

The term "soluble in styrene" means that deformed shape and filamentized state of the glass fiber strands occur when the strands are picked up with fingers. This occurs because of the reduction in bonding strength between the glass filaments when glass fiber strands collected with a sizing agent which is soluble in styrene or is swollen by the contact with styrene to cause reduction in bonding strength, are dipped into the styrene for a predetermined time. The time required for the sizing agent to be dissolved in the styrene (dissolving time) depends upon the kind of sizing agent; the treating process of the glass fiber strands; the number of glass filaments forming the glass fiber strands. The dissolving time becomes larger when the drying temperature for the collected glass fiber strands is higher or the drying time is longer or the number of glass filaments is greater. It is preferable to use glass fiber strands having a dissolving time of at least 20 seconds, especially in the range between 30 seconds and 240 seconds. In other words, binder of the glass fiber strands used in the present invention is not dissolved in styrene for at least 20 seconds, but is dissolved in a time preferably between 30 seconds and 240 seconds. It is preferable to use a reinforcing mat comprising a first layer and a second layer in which the binder of the glass fiber strands in each layer is dissolved simultaneously.

The binder for imparting the above-mentioned property to the glass fiber strands can be an emulsion of homopolymer of vinyl acetate or a graft copolymer of vinyl acetate-PVA having low PVA content, or having a low polymerization degree of PVA as a main component.

When the glass fiber strands are impregnated with an unsaturated polyester resin properly used as thermosetting resin for a mat of the above embodiment, the resin is uniformly distributed on the mat in a short time because the sizing agent of the glass fiber strands is not dissolved by the styrene contained in the unsaturated polyester resin for a specified time and filamentization of the strands does not occur. The sizing agent is dissolved when a rolling operation is applied to filamentize and crush the strands so that the bulk density if further increased and air bubbles between filaments are easily removed.

A third layer can be bonded in the first layer in an embodiment of a reinforcing mat for FRP of the present invention. Glass fiber strands as the third layer are arranged in parallel to the longitudinal direction on the first layer without any slack. It is preferable to use glass fiber strands having a diameter in the range between $9\mu$ and $18\mu$ and a collected number of more than 300, preferably in the range between 600 and 4000.

FRP obtained by using a reinforcing mat for FRP according to the present invention has the advantages in that the strength and the GC in different directions are large; air bubbles are easily removable and the peeling of the surface layer does not occur even with the application of rolling.

An example of the present invention will be described.

EXAMPLE

A reinforcing mat for FRP was prepared as follows: 1000 glass filaments having a diameter of 13μ are collected by applying a sizing agent containing 0.3% of saturated polyester, 0.1% of silane coupling agent and 0.1% of oiling agent as solid content to form glass fiber strand having the count of yarn of 360 gr/1000 m. 10 Glass fiber strands were put on a conveyor moving at a speed of 5 m/min. at a rate of 800 gr/m². Other glass fiber strands were prepared by collecting 50 glass filaments having a diameter of 10μ by applying a sizing agent containing 0.5% of graft copolymer of polyvinyl alcohol and polyvinyl acetate, 0.05% of a silane coupling agent and 0.05% of oiling agent to be 10 gr/1000 m. The glass fiber strands, after having been cut into 5 cm, were put on the strand layer on the conveyor at a rate of 200 gr/m². Polyester powder was applied to the glass strand layers at 3 percent in weight to the total weight of the glass fiber and compression force was applied to the layers while heating them to produce a reinforcing mat.

The reinforcing mats stacked in three layers were impregnated with unsaturated polyester resin and the hand-lay-up process was applied to the stacked mats to obtain a plate-like FRP having a thickness of 3.65 mm, a GC of 51% and a tensile strength of 23.9 kg/mm². The FRP has a uniform tensile strength (the tensile strength in the direction to the plate surface, that is, the overlapping surface of the reinforcing mat for FRP) in any direction, prevent the peeling of the surface layer when the rolling is applied and air bubbles are easily removed.

We claim:

1. A reinforcing mat for fiber reinforced plastic material to be manufactured by the hand-layup process, which consists essentially of:
    a first layer of curled glass fiber strands arranged in a non-directional manner in the layer, each strand being formed of a collection of at least 300 glass filaments and each having a length of more than 60 cm and the density of said first layer being in a range of from 400 g/m² to 1500 g/m²;
    a second layer, thinner than said first layer, of glass fiber strands arranged in a non-directional manner on said first layer, the length of the strands being in a range of from 2 cm to 15 cm and the density of said second layer being in a range of from 50 g/m² to 500 g/m²; and
    a polyester binder for bonding said first and said second layers.

2. The reinforcing mat of claim 1, wherein the strand from which the curled glass fiber mass of said first layer is formed, is a collection of less than 1200 glass filaments.

3. The reinforcing mat of claim 1, wherein the lengths of the strands of said second layer fall within the range of from 3 cm to 10 cm.

4. The reinforcing mat of claim 1, wherein the glass strands of said first and second layers are formed by bonding glass filaments together with a sizing agent which is not dissolved by styrene for at least 20 seconds.

5. The reinforcing mat of claim 4, wherein said sizing agent is dissolved by styrene within 240 seconds.

6. The reinforcing mat of claim 1, wherein the density of the curled glass fiber strands in said first layer ranges from 600 to 1500 g/m².

7. The reinforcing mat of claim 1, wherein said sizing agent is an emulsion of a homopolymer of vinyl acetate or a graft copolymer of vinyl acetate-PVA having a low PVA content, or having a low polymerization degree of PVA as a main component.

8. A process for preparing a reinforcing mat for fiber reinforced plastic material to be manufactured by the hand-layup process, which comprises:
    applying to glass filaments a sizing agent and gathering the glass filaments into a strand;
    accumulating a large number of said strands in a curled and non-directional manner to form a first layer, each strand of said first layer being formed by a collection of at least 300 glass filaments having a length of more than 60 cm and the density of said first layer being in a range of from 400 g/m² to 1500 g/m²;
    applying to glass filaments a sizing agent and gathering the glass filaments into a strand;
    accumulating a large number of said strands in a non-directional manner to form a second layer, said second layer being thinner than said first layer, the length of the strands being in a range from 2 cm to 15 cm and the density of said second layer being in a range of from 50 g/m² to 500 g/m²; and
    bonding said first and second layers by a polyester binder.

9. The process of claim 8, wherein said sizing agent is dissolved by styrene in a time ranging from 20 to 240 seconds.

10. The process of claim 8, wherein the density of the curled glass strands in said first layer ranges from 600 g/m² to 1500 g/m².

11. The process of claim 8, wherein the strands of said first layer are formed of a collection of less than 1200 glass filaments.

12. The process of claim 8, wherein the lengths of the glass strands in said second layer are in the range of from 3 cm to 10 cm.

13. The process of claim 8, wherein said sizing agent is an emulsion of a homopolymer of vinyl acetate or a graft copolymer of vinyl acetate-PVA having a low PVA content, or having a low polymerization degree of PVA as a main component.

14. A method of manufacturing a fiber reinforced plastic material by the hand-layup process, which comprises:
    forming a composite mat by bonding, using a polyester binder, a first layer of curled glass fiber strands arranged in a non-directional manner in the layer, each strand being formed of a collection of at least 300 glass filaments and having a length of more than 60 cm and the density of said first layer being in the range of from 400 g/m² to 1500 g/m² and a second layer, thinner than said first layer, of glass fiber strands arranged in a non-directional manner on said first layer, the length of the strands being in the range of from 2 cm to 15 cm and the density of said second layer being in the range of from 50 g/m² to 500 g/m², the glass strands of said first and second layers being formed by bonding glass filaments together with a sizing agent which is dissolved by styrene;

impregnating said composite mat with liquid unsaturated polyester resin to give a uniform distribution of the resin in said composite mat; and applying a rolling operation to filamentize and crush the strands of said composite mat after said sizing agent is dissolved by styrene.

15. The method of claim 14, wherein said sizing agent is dissolved by styrene over a time ranging from 20 seconds to 240 seconds.

16. The method of claim 14, wherein the strands of said first layer are formed of a collection of less than 1200 glass filaments.

17. The method of claim 14, wherein the length of the strands of said second layer are within the range of from 3 cm to 10 cm.

18. The method of claim 14, wherein the sizing agent is an emulsion of a homopolymer of vinyl acetate or a graft copolymer of vinyl acetate-PVA having a low PVA content, or having a low polymerization degree of PVA as a main component.

* * * * *